Patented Sept. 15, 1931

1,823,519

UNITED STATES PATENT OFFICE

ALFRED M. THOMSEN, OF SAN FRANCISCO, CALIFORNIA

MANUFACTURE OF SULPHITE PAPER PULP

No Drawing.   Application filed March 25, 1929.   Serial No. 349,897.

It has long been known that acid sodium sulphite is a far better cooking medium than the corresponding salts of either lime or magnesia or mixtures of both, and were it not for the greater cost it would before this have become the recognized standard. Many suggestions have been made to overcome this difficulty by rendering the operation cyclic so far as the soda is concerned, soda and sulphate cooking being taken as patterns. But these recovery systems cannot be said to solve the problem. There is still quite a loss of soda and impurities gradually build up in the circuit causing much trouble.

Hereinafter, I use the phrase "reducing conditions" in the sense of a general term, customarily employed by those familiar with the art, to designate some type or form of chemical change conducted in the absence of oxygen, or with insufficient oxygen for complete combustion.

The new and useful improvement which I have invented overcomes all this difficulty, uses a cheap source of soda as raw material, and yields as an end product another salable soda compound worth many times the cost of the raw material employed. It is not quite correct to consider this compound merely as a "by-product" of the pulp industry. The relative values are such that it is more correct to say that the process is undertaken to manufacture two major products, e. g., paper pulp and sodium sulphide.

The process consists of the following steps:

(I) Manufacturing sodium bisulphite by decomposing the ordinary lime cooking liquor with sodium sulphate, and removing the calcium sulphate formed.

(II) Cooking the wood with this liquor and separating the pulp from the spent waste liquor as in ordinary practice.

(III) Neutralizing this spent liquor with sodium carbonate produced later in the process under (VI), and adding sufficient excess to remove the calcium sulphate not separated under (I), separating the calcium carbonate thus formed.

(IV) Evaporating the liquid from (III) in multiple effect evaporators until of a syrupy consistency.

(V) Incinerating said syrupy liquor under reducing conditions whereby an ash consisting principally of sodium carbonate and sodium sulphide is obtained, and all organic matter removed.

(VI) Dissolving the ash from (V) in water and separating the two major constituents of same by fractional crystallization.

(VII) Returning the carbonate recovered in (VI) to the circuit under (III), and packing the sulphide for sale.

Necessarily, these steps can also be applied to the waste liquor of the ordinary sulphite process, rendering its disposal remunerative wherever cheap saltcake is avaiable. The steps therefore become altered as follows:

(I) Neutralizing the waste liquor with sodium carbonate.

(II) Adding sodium sulphate and separating the resultant calcium sulphate sludge.

(III) Adding excess sodium carbonate and separating the calcium carbonate precipitated.

(IV) Evaporating the liquid from (III) to a syrupy consistency in multiple effect evaporators.

(V) Incinerating said syrupy liquor under reducing conditions whereby as ash consisting principally of sodium carbonate and sodium sulphide is obtained, and all organic matter destroyed.

(VI) Dissolving the ash from (V) in water, and separating the two major constituents of same by fractional crystallization.

(VII) Returning the carbonate recovered in (VI) to the circuit under (I) and (III), and packing the sulphide for sale.

In both these instances the cost of paper pulp has been much reduced by the simultaneous production of another valuable product; a nuisance in the shape of waste liquor has been disposed of and turned into a profit, and in the first instance cited a superior grade of pulp has likewise been produced.

I claim:

1. In the process of manufacturing paper pulp the method consisting of decomposing an acid calcium sulphite solution with sodium sulphate, separating the calcium sulphate produced, digesting the chips with the liquor thus produced, separating the pulp from the spent liquor, neutralizing said liquor and removing calcium sulphate from same as calcium carbonate by means of sodium carbonate, separating the sludge of calcium carbonate formed, evaporating the liquor thus obtained to a syrupy consistency, incinerating said liquor under reducing conditions, dissolving the resultant ash in water, separating the contained sodium carbonate from sodium sulphide, and returning the sodium carbonate to the process for neutralizing the above-mentioned liquor.

2. In the process of manufacturing paper pulp, the method consisting of cooking the chips with an acid solution of calcium bisulphite, separating the pulp from the spent liquor, neutralizing said liquor with sodium carbonate, adding saltcake to precipitate calcium sulphate, removing the calcium sulphate, adding sodium carbonate to the resulting liquor and removing the calcium carbonate produced, evaporating the liquor to a syrupy consistency, incinerating said syrupy liquor under reducing conditions, dissolving the resultant ash in water, separating the contained sodium carbonate from sodium sulphide, and returning the sodium carbonate to the process for neutralizing the above-mentioned liquor.

In testimony whereof I hereunto set my signature.

ALFRED M. THOMSEN.